US009959906B2

(12) United States Patent
Tran

(10) Patent No.: US 9,959,906 B2
(45) Date of Patent: May 1, 2018

(54) METHOD AND A RECEIVER DEVICE CONFIGURED TO MARK DIGITAL MEDIA CONTENT

(71) Applicant: NAGRAVISION S.A., Cheseaux-sur-Lausanne (CH)

(72) Inventor: Minh Son Tran, Bourg la Reine (FR)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 54 days.

(21) Appl. No.: 14/613,763

(22) Filed: Feb. 4, 2015

(65) Prior Publication Data
US 2015/0221340 A1 Aug. 6, 2015

(30) Foreign Application Priority Data
Feb. 5, 2014 (EP) .................................... 14153904

(51) Int. Cl.
*G11B 27/034* (2006.01)
*G11B 27/34* (2006.01)
(Continued)

(52) U.S. Cl.
CPC ............ *G11B 27/034* (2013.01); *G06T 1/005* (2013.01); *G06T 1/0085* (2013.01); *G11B 27/34* (2013.01);
(Continued)

(58) Field of Classification Search
CPC ....... G11B 27/034; G11B 27/34; G06T 1/005; G06T 1/0085; G06T 2201/0051;
(Continued)

(56) References Cited

U.S. PATENT DOCUMENTS 7,092,620 B1 * 8/2006 Standiford ............. G11B 25/10
386/241
2003/0002851 A1 * 1/2003 Hsiao .................... G11B 27/034
386/280

(Continued)

FOREIGN PATENT DOCUMENTS

WO         WO 99/65241       12/1999

OTHER PUBLICATIONS

European Search Report issued in EP 14153904.9 dated May 26, 2014.

*Primary Examiner* — Thai Tran
*Assistant Examiner* — Nien-Ru Yang
(74) *Attorney, Agent, or Firm* — DLA Piper LLP (US)

(57) ABSTRACT

A method and a receiver device configured to mark a media content sequence comprising a succession of media frames. A decoder included in the receiver device selects at least two decoded consecutive media frames from the media content sequence according to a predefined information code previously stored in a configuration setting memory of the receiver device. A marking module associated to the decoder inserts a transition effect between the at least two selected decoded consecutive media frames including a preceding media frame and at least one immediately following media frame. The transition effect is retrieved from a library of transition effects stored in a memory associated to the marking module and applied on the basis of the preceding media frame and the at least one immediately following media frame. The inserted transition effect is then assigned to a secrete symbol associated to all or part of a unique identifier specific to the receiver device which outputs thus a modified sequence of media content comprising at least one transition effect between the at least two selected consecutive media frames.

14 Claims, 3 Drawing Sheets

(51) Int. Cl.
  *G06T 1/00* (2006.01)
  *H04N 1/32* (2006.01)
  *H04N 21/8352* (2011.01)
  *H04N 21/8358* (2011.01)

(52) U.S. Cl.
  CPC ..... *H04N 1/32352* (2013.01); *H04N 21/8352* (2013.01); *H04N 21/8358* (2013.01); *G06T 2201/0051* (2013.01); *G06T 2201/0083* (2013.01)

(58) Field of Classification Search
  CPC ........ G06T 2201/0083; H04N 21/8358; H04N 1/32352; H04N 21/8352
  USPC ......................................................... 386/280
  See application file for complete search history.

(56) References Cited

U.S. PATENT DOCUMENTS

| | | | |
|---|---|---|---|
| 2004/0008864 A1 | 1/2004 | Watson et al. | |
| 2005/0265576 A1* | 12/2005 | Seong | G06T 1/0028 382/100 |
| 2012/0163653 A1 | 6/2012 | Anan et al. | |
| 2012/0300977 A1* | 11/2012 | Petrovic | G06T 1/0021 382/100 |

* cited by examiner

METHOD AND A RECEIVER DEVICE CONFIGURED TO MARK DIGITAL MEDIA CONTENT

CROSS-REFERENCE TO RELATED APPLICATION

This application claims the prior of European Application No. 14153904.9, filed Feb. 5, 2014.

FIELD OF THE INVENTION

The present invention relates to a method and a receiver device configured to mark digital media content for identifying their origin in order to prevent unauthorized distribution of copies.

TECHNICAL BACKGROUND

In the field of digital video processing, forensic watermarking, also called fingerprinting, is a common technique to mark the data processed by a receiving device. It is a way to trace the content if the latter is found on Internet for example, without protection. A first approach is to embed a fingerprint at broadcast side. The server carefully combines secret information (for example copyright information) with the video content in order to hide it into the content so that the receiver can extract back the information for authentication/owner proofing of the content. Another approach is to incorporate the secret at the receiving device side by adding a mark specific to an identification of the receiving device; If a receiving device is a source of illegal redistribution, its individual mark can be extracted and the device itself is clearly identified.

Inserting information into video content is a complex process, where invisibility without compromise on the mark's robustness is the main target. In some cases, due to the insertion mechanism, it may be impossible to reach a perfect invisibility.

Video watermarking techniques are disclosed for example in document US2005/0265576A1 which discloses a video watermarking method and a video content protecting method and apparatus. The method includes detecting scene transition in a video sequence, calculating an image complexity in a scene using one or more frames included in the scene and determining a watermark embedding strength for the scene, and embedding a watermark into the video sequence according to the watermark embedding strength. The watermark thus embedded is invisible.

Document US2004/0008864A1 discloses a method of embedding information in a media stream. The method includes steps of selecting a set of locations within that media stream to embed information, selecting a set of possible alterations to make at those locations, and making a subset of the possible alterations. The set of locations and possible alterations is herein sometimes called a "watermark." The subset of actual alterations that are made is herein sometimes called a "fingerprint." The method determines a set of locations at which there are alternative versions of the same media stream, such as one being the original and one being an alternative version of the same media stream (alt-movie). More than one alt-movie or alt-block can be defined for each location in order to permit more than one bit of information to be embedded at each location. Thus, each such location can embed one or more bits of information, the embedded bits being responsive to whether the original movie or the alt-movie is selected for that location. In a preferred embodiment, the method includes noting those blocks at which an alt-block can be selected, and selecting the particular alt-block at each block in response to a random or pseudorandom effect. This type of effect may help a fingerprint resist attacks that attempt to study the run-level codes in order to "undo" the fingerprint. It may also help to spread the watermarking over a relatively large range of spatial frequencies of the content, further diminishing visible effects while also helping to resist attacks.

Fingerprinting techniques recently become more and more attractive as a complementary protection to the scrambling/encrypting techniques. While the latter can secure a pay-content over a delivery network up to but not farther than the final user terminal, fingerprinting continue to protect the content (in a reactive way) for the whole lifetime of the content at a predefined acceptable quality.

However, although achieving vivid performances, the fingerprinting technology still faces the following problems:
- Generally speaking, an invisibly inserting method is relatively fragile against various type of content-transformation either intentional or not;
- Inserting an invisible mark requires rather a complex detection process, which is not always feasible in some extreme cases;
- With inserting a visible mark to avoid the above drawbacks, honest consumers often suffer from disturbing degradation of the content-quality, which can become harmful to the image or reputation of the service provider.

SUMMARY OF THE INVENTION

The aim of the invention is to overcome above mentioned issues by inserting a visible mark intended to be resistant against attacks and also in order to ease the detecting process.

This aim is achieved by a method to mark a media content sequence in a digital data stream received by a receiver device, the receiver device comprising at least one processor, memories, a descrambler and a decoder producing a clear sequence of media content, said sequence comprising a succession of media frames, the method is characterized in that it comprises steps of:
- selecting, by the decoder, at least two decoded consecutive media frames from the clear media content sequence according to a predefined information code previously stored in a configuration setting memory of the receiver device,
- inserting by a marking module a transition effect between the at least two selected decoded consecutive media frames including a preceding media frame and at least one immediately following media frame, the transition effect being retrieved from a library of transition effects stored in a memory associated to the marking module and applied on the basis of the preceding media frame and the at least one immediately following media frame,
- assigning a secret symbol to the inserted transition effect, the secret symbol being associated to all or part of a unique identifier specific to the receiver device,
- outputting a modified sequence of media content comprising at least one transition effect between the at least two previously selected consecutive media frames.

The media content sequence consists generally of an audio/video content sequence where media frames are video frames or images as well as audio frames or sound elements.

Preferably, according to the method, a visible mark is introduced into a video content in the form of various visual transition effects which are usually used in composition/mix phase of program production. Hence the impact of the mark is thus no longer a disturbing element or a degradation of the video content. Its appearance can be smoothly integrated into the content as one of its "natural" scene-events to be conveyed to clients. Operations of post editing and mixing are the indispensable post processing in a full chain of program content production. During this phase, an operator may assemble a plurality of video sources, equalize the audio level, and add some transition effect to build up a final content with coherently concatenated sequences of events. Such fine-tuning operations can be exploited on purpose to carry specific information such as a unique identifier without being considered as a kind of noise obscuring the intended information i.e. original content in that video program.

A further object of the invention consists of a receiver device configured to mark a media content sequence in a digital data stream, the receiver device comprising at least one processor, memories, a descrambler and a decoder configured to produce a clear sequence of media content, said sequence comprising a succession of media frames, the receiver device being characterized in that:

the decoder is further configured to select at least two decoded consecutive media frames from the clear media content sequence according to a predefined information code previously stored in a configuration setting memory of the receiver device, the decoder is associated to a marking module configured to insert a transition effect between the at least two selected decoded consecutive media frames including a preceding media frame and at least one immediately following media frame, the transition effect being retrieved from a library of transition effects stored in a memory of the marking module, the marking module being further configured to assign a secret symbol to the inserted transition effect, the secret symbol being intended to be associated to all or part of a unique identifier specific to the receiver device, and to output a modified sequence of media content comprising at least one transition effect between at least two previously selected consecutive media frames.

The information code instructs the marking module to handle at least two decoded consecutive media frames of the media content sequence between which a transition effect will be inserted. This information code may further indicate a location of the media frames to select for inserting a transition effect whose type may be also designated by an identifier or an index in the library. A media frame may be located either by its time after a reference time defined in the media content sequence such as the start time or by a predetermined number of frames after an initial frame of the media content sequence. The reference time and the initial frame may be determined as an occurrence of a second type of transition effect selected from the library of transition effects in the memory of the marking module.

Yet in other embodiment of the invention, the insertion of a transition effect TEi is expected after a predefined number of media frames (or time-duration) after an occurrence of a positional transition effect TEp (TEp can be identical to TEi). In fact the occurrences of the positional transitions effects TEp are used to signal the position of the inserted transitions effects TEi, which itself carries the secret information or symbol.

Generally, the marking module adds more than one transition effect in a given media content sequence in order to assign series of secret symbols to a unique identifier associated to the receiver device. The output media content sequence is thus marked i.e. fingerprinted in a unique way for a given receiver device. Even the mark is visible in a video content sequence, it can be considered as resisting to attacks because distinguishing "naturally present" transition effects from the added ones cannot be made easily without analyzing the modified video content sequence by comparison with the original one. An advantage of this fingerprinting is that it does not degrade at all quality of the original video content sequence. Analogous observations can be made with audio content sequences where audio transition effects (echoing, fading in/out . . . ) have been inserted.

BRIEF DESCRIPTION OF THE DRAWINGS

The invention will be better understood with the following detailed description, which refers to the attached figures given as non-limitative examples.

DETAILED DESCRIPTION

Figure 1:
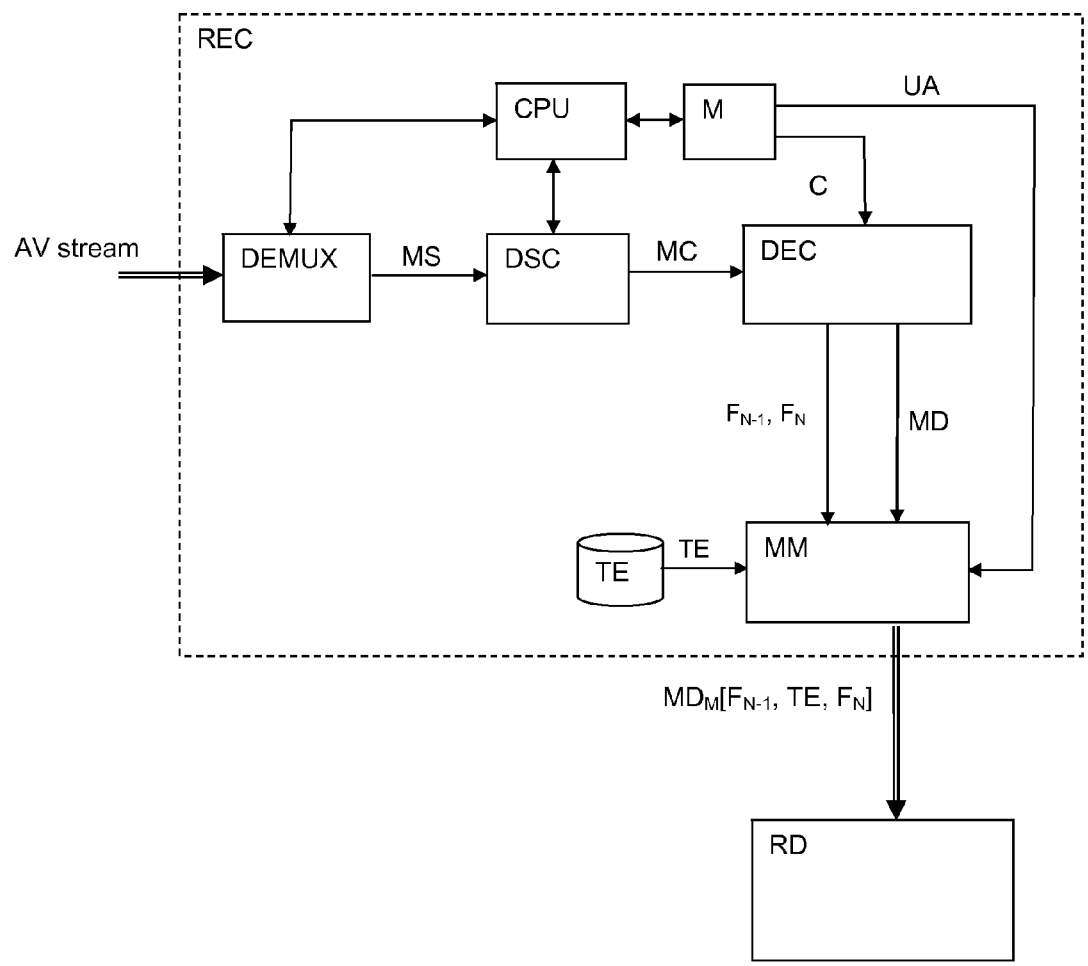
FIG. 1 shows a block diagram of a receiver device configuration suitable for performing descrambling, decoding and marking the media content data with a transition effect according to the invention.

Reference will now be made in detail to the preferred embodiments of the invention with examples illustrated by the drawings. While the invention is described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In the field of pay-TV, once an audio and/or video content is descrambled, it is favorable that the receiving device can add a mark specific to its identification to extend the scope of protection: ensuring content protection even after the decryption steps, through final client's identifier insertion into the content itself, in order to discourage illegal distribution of the content.

A receiving device REC has, for example, the form of a set-top-box, an advanced television set or a CAM (conditional access module) in charge of receiving the audio and/or video content data and removing encryption protection. For that purpose, the receiving device REC comprises at least one processor CPU managing a demultiplexer DEMUX for demultiplexing audio and/or video content packets of an input stream and at least one descrambler module DSC configured to descramble audio and/or video content data with a cryptographic key. The obtained descrambled but still compressed audio and/or video content data is then decoded by a decoder DEC module into a format suitable for a rendering device RD such as loudspeakers and/or TV screen. Memories M associated to the processor CPU storing receiver device REC operating programs, parameters and other data, it may also store a unique mark or identifier UA used to mark audio and/or video content data.

The descrambler module DSC, generally in form of a chipset is well secured together with the decoder DEC also in form of a chipset thanks to one of the following architectures: only one chipset performs descrambling and decoding at a same time, or the data exchanged between the descrambler module DSC and decoder DEC chipsets are protected with a known static or dynamic pairing technique for example.

According to a preferred embodiment, the receiving device REC further comprises a marking module MM which marks the content data with a unique mark UA being derived from an internal parameter of the receiving device REC such as the serial number. The receiving device REC comprises generally a security module to handle all the security operations. A security module may have various forms such as a removable module like a smartcard or a USB dongle, or it may be embedded in the receiving device in the form of a single chip mounted on a main circuit board or a mix of these forms.

The marking module MM in form of hardware and software modules may be either a separate unit connected to the decoder DEC of a pay TV receiver device REC as illustrated in the example of FIG. 1 or integrated inside the decoder DEC.

Scrambled and compressed audio/video data packets MS, filtered from other data of the multiplexed stream by the demultiplexer DEMUX, enter the descrambler DSC which outputs descrambled (but still encoded/compressed) audio data packets MC. These audio/video data packets MC are then forwarded to the proper decoder DEC module to obtain decoded audio/video data MD suitable for presentation by a rendering device RD.

According to the present invention, the decoded audio/video data MD comprising clear media content sequences made up of a succession of media frames such as video images or audio frames are marked before they reach the rendering device RD. The decoder DEC selects on the fly i.e. while outputting the clear media content sequence MD, at least one set of two decoded consecutive media frames $F_{N-1}$, $F_N$. Generally several sets of media frame are selected in a given sequence and stored in a temporary memory or buffer included in the decoder DEC itself or in the marking module MM. This selection is performed by using an information code C stored for example in a configuration settings memory of the receiver. The information code C comprises instructions and parameters indicating a type of transition effect, locations where to insert transition effects either by time stamps relative to a reference time or by a number of frames after an initial frame. The reference time or the initial frame may correspond to a start of the audio/video content sequence or to a particular frame designated by a parameter of the information code C. Scene cut—a sudden content-change in successive frame—can be an example of such particular frame. When several effects are inserted, the location may be defined in a relative way, i.e. relatively to the first inserted effect or at predefined time or number of frames intervals after each inserted predefined effect without referring to a fixed reference location.

The information code C which is preferably specific to an audio/video content sequence may be sent by a managing center or content provider to the receiver device REC via control messages ECM, managing messages EMM, or other configuration messages associated to the audio/video content sequence within the input audio/video digital data stream.

Figure 2:
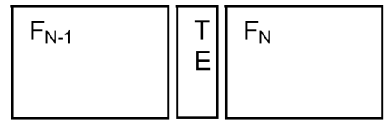
FIG. 2 shows a transition effect between two consecutive media frames

The marking module inserts a transition effect TE between the two selected decoded consecutive media frames including a preceding media frame $F_{N-1}$ and an immediately following media frame $F_N$ as illustrated by FIG. 2. The transition effect TE is taken from a library stored in a memory associated to the marking module MM during an initialization and user specific configuration phase of the receiver. According to an embodiment, by inserting a transition effect TE between two frames, the temporary memory of the marking module MM is not reset completely so that the preceding frame $F_{N-1}$ can be used to generate a transition effect applied to a current decoded image $F_N$ and to some following images $F_{N+1}$, $F_{N+2}$, etc.

The clear media content sequence MD at the output of the receiver device REC is thus modified by addition of transition effects which rather contribute to improve—in a compositional manner—visual or sound presentation of the media content sequence on the rendering device RD than introduce any degradation.

A transition effect TE consists of a method to change a scene from one view to another. Transition effects can give visual interest to a presentation by introducing an element of motion to the graphics. In video editing, they can help establish a change in location, or indicate the passage of time. There are literally hundreds of transition effects, and the exact terminology varies from program to program. The main transition effects are:

a) Cut: the most common transition consisting of an instant change from one image to the next. A video sequence contains cuts between images where recording has been stopped and restarted either immediately or after a certain time period in a same or another location, etc.

b) Mix, Dissolve, Crossfade: the first image is gradually replaced with the second image, either by superimposing the images in mid-transition (like a double exposure) or by replacing the image pixel-by-pixel or in larger blocks grouping a set of pixels.

c) Swipe, Wipe: the first image is seemingly wiped off, revealing the second image underneath. Swipes can go from left to right, right to left, up, or down, and the speed and the sharpness of the swipe edge can usually be controlled. An image may also be progressively replaced by another image in geometric pattern going from straight lines to complex shapes. Wipes often have a colored border to help distinguish the images during the transition. Wipes are often used to show location changes.

d) Fade: the image either darkens to black or lightens to pure white. The fades usually signal the beginning and end of scenes. They can be used between images to create a sort of crossfade which, for example, fades briefly to white before fading to the next image. A video fade is when an image gradually fades to (or from) a single color, usually black or white. A fade is different to a crossfade, which is a transition directly between two images rather than one image to a color. The timing of the fades indicates the importance of the change in time and/or location between scenes, for example, a slower fade with more time spent on black indicates a more significant end/beginning. Sometimes, two quick fades together can form a single transition similar to a crossfade as an image may fade very quickly to white before fading back into the next image.

e) Fly-in: an image or an image element moves suddenly from off-screen.

f) Digital Effects: a large selection of digital transitions with various effects can be found in various video editing applications. These effects include color replacement, animated effects, pixelization, focus drops, lighting effects, mosaic, etc.

The transition effects are not only applied to images but also to audio frames where they may be heard as sound effects such as echoing, slow volume increase/decrease, high or low pass filtering etc.

The above effects can be grouped into several natures of scene-cut so that its application is harmonized perfectly with the event in the scene. For example, two distinctive situations are given as follow:

If the preceding frames correspond to slow motions subjected to an emotional event, a fading effect with slow speed can be applied to the next scene-cut.

In contrary case, whenever the preceding frames correspond to fast motion with sharp audio corresponding to an action scene, some fast, explosive shape of transition effect can be performed.

The information code C may further indicate which type of video or audio transition effect to apply between the selected frames at which time or number of frames after a reference time or initial frame. For example a wipe effect can be applied between frames at 3 minutes from the start of the sequence; after 5 minutes from the start or 2 minutes after the wipe effect, a fade effect can be inserted.

Figure 3:
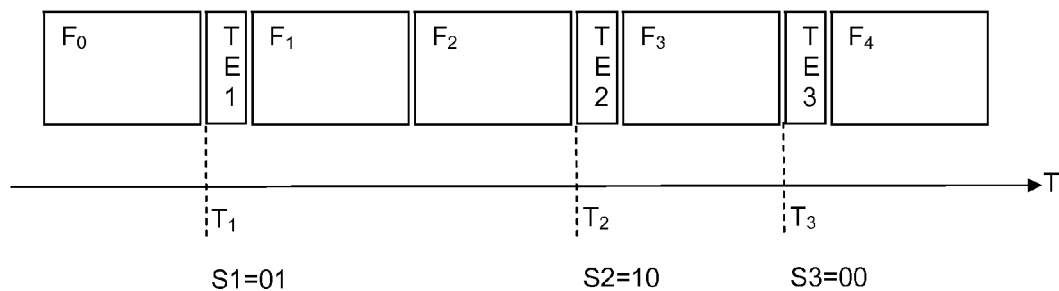
FIG. 3 shows a set of media frames comprising transition effects each associated to a secret symbol.

The marking module attributes a secret symbol such as an alpha-numeric character, a bit string or any character string to each type of the transition effect TE intended to be inserted in an audio video content sequence. FIG. 3, illustrates an example where transition effects TE1, TE2 and TE3 at time T1, T2, T3 respectively in a video content sequence are each designated by a secret symbol in form of a 2 bit string S1=01, S2=10 and S3=00. Note that transition effect TEi is one specific effect among a set of at least 4 different transition effects in order to map exclusively one symbol of 2 bits (4 possible values) to one transition effect The symbols S1, S2 and S3 are then concatenated together to form all or part of a unique identifier UA stored in a configuration memory of the receiver device REC:

The secret symbols may either be initially associated to each stored transition effect as a constant or it may be generated by combining a type reference of a given transition effect with its position data (time, number of frames) or location within the video content sequence. In this case a same transition effect will be associated with a different secret symbol depending on the location of the effect in the video sequence. The combination may be carried out by using a mathematical function such as bitwise exclusive OR (XOR), addition, multiplication, etc.

According to an embodiment, a secret information symbol B of for example 1 bit can be inserted between two consecutive frames for indicating absence or presence of an added transition effect:

B=0 indicates that the video content sequence is kept intact: after a frame $F_N$, the following frames $F_{N+1}$, $F_{N+2}$, . . . are output without modification.

B=1 indicates that several intermediate frames between frame $F_N$ and $F_{N+1}$ are generated via an interpolation performed over the frames $F_N$ and $F_{N+1}$ by the selected transition effect.

Figure 4:
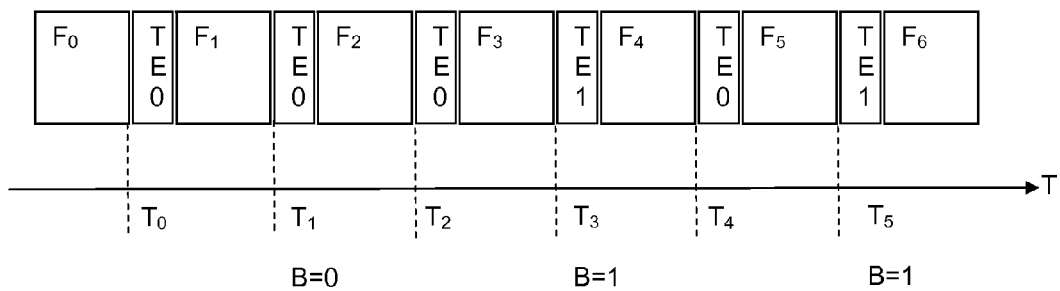
FIG. 4 shows a set of media frames with an original transition effect (ambiguous ones) and additional transition effects (marking ones), each indicated by an information bit. Only the marking transition effects are associated to a secret symbol.

FIG. 4 illustrates an example where a transition effect TE1—referred to as marking transition effect—is added between frames $F_3$ and $F_4$ and another TE1 between frames $F_5$ and $F_6$. These effects signaled by the information block B=1 can thus be easily detected by a video sequence analyzer. Similarly, the marking transition effect TE1 is not inserted between frames $F_1$ and $F_2$ deliberately in order to signal the information block B=0. FIG. 4 also shows some "natural" transition effects TE0—referred to as ambiguous transition effect—(TE0 and TE1 can be identical type of transition effect) between frame $F_2$ and $F_3$ as well as $F_4$ and $F_5$.

It has to be noted that the interpolation can be performed over more than one successive original frame to create a really smooth transition in a natural way so that viewers are unlikely recognize "strange" negative impact of such visible modification.

In FIG. 4 either the time stamps $T_1$, $T_3$ and $T_5$ or the preceding frames $F_1$, $F_3$ and $F_4$—where a marking transition TE1 can be expected—must be registered and informed to the video sequence analyzer in order to distinguish the marking transition effect TE1 from the ambiguous ones TE0. This operational mode is called guided detection. Reference information—time stamps or preceding audio/video frames themselves—are necessary for successful detection of marking transition effects TE1 in this mode.

Figure 5:
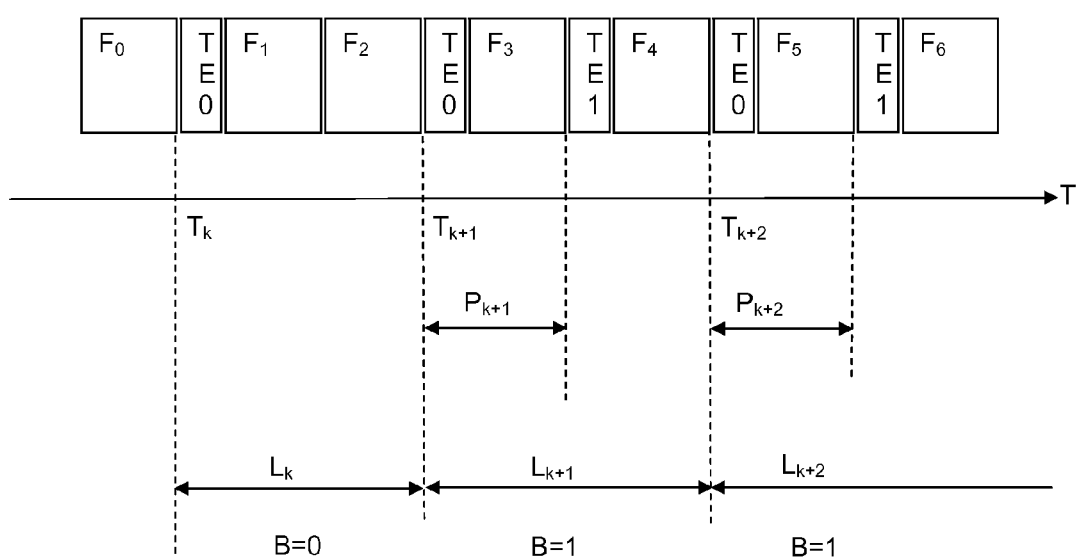
FIG. 5 shows a set of media frames with a positional transition effects—hinting/foreseeing the position of marking effects, which are associated to a one-bit secret information.

FIG. 5 illustrates a so-called blind detection mode, which no longer requires the reference information. A predefined transition effect TE0—referred to as triggering transition effect—may be inserted into the video sequence frequently at a certain time $T_k$, $T_{k+1}$ and $T_{k+2}$ with durations $L_k$, $L_{k+1}$ and $L_{k+2}$ not necessarily identical between the successive occurrences of the transition effects TE0. These durations are preferably shorter than a predefined threshold $L_{max}$. If during a period between two successive transition effects TE0, no marking transition effect TE1 can be detected—for instance between frame $F_0$ and $F_3$—the secret information symbol B=0 is considered as detected. Otherwise, if marking transition effects TE1 are detected after a certain delay $P_{k+1}$ and $P_{k+2}$ ($P_{k+1}$ and $P_{k+2}$ shorter than the threshold $L_{max}$) starting from the presence of the triggering transition effect TE0—for instance at time $T_{k+1}$ and $T_{k+2}$ respectively—the secret information symbols B=1 are detected. The resulting sequence values of such detected secret information symbols B form a unique identification for each receiver device.

The finally rendered video content sequence at the output of the receiver device will contain special transition effects which are unique for each user (i.e., receiver device of a given user, decoder chipset or other module composing the receiver device). In case of particular well-chosen transition effects and their occurrences' positions, the artistic presentation of the video content may even be improved compared to the original video content without special transition effects.

The added transition effects in the modified video content sequence can be detected according to the guided mode by comparison with the original video content sequence or by detecting specific correlations between successive frames themselves as exclusive consequence of the added transitions effects according to the blind mode.

The invention claimed is:

1. A method to mark a media content sequence in a digital data stream received by a receiver device, the receiver device comprising at least one processor, at least one memory, a descrambler, and a decoder producing a clear sequence of media content, said sequence comprising a succession of media frames, the method comprising steps of:
- selecting, by the decoder, at least two decoded consecutive media frames from the clear sequence of media content according to a predefined information code previously stored in a configuration setting memory of the receiver device, the information code comprising instructions and parameters indicating a type of transition effect, locations where to insert transition effects either by time stamps relative to a reference time or by a number of frames after an initial frame, and the at least two decoded consecutive media frames including a preceding media frame and at least one immediately following media frame;
- inserting, by a marking circuit, a first mark between the preceding media frame and the at least one immediately following media frame, the first mark comprising a transition effect being retrieved from a library of transition effects stored in a memory associated to the marking circuit and applied on the basis of the preceding media frame and the at least one immediately following media frame;
- inserting, by the marking circuit, a second mark between two consecutive media frames, the second mark preceding the at least two decoded media frames, the second mark comprising a secret information symbol indicating an absence or presence of the first mark between the at least two decoded consecutive media frames;
- assigning a secret symbol to the first mark, the secret symbol being formed by a bit string associated to all or part of a unique identifier specific to the receiver device; and
- outputting a modified clear sequence of media content comprising the first mark between the at least two decoded consecutive media frames and the second mark.

2. The method according to claim 1 wherein the clear sequence of media content comprises video frames or audio frames, said sequence being modified by inserting transition effects between the at least two consecutive video frames or audio frames.

3. The method according to claim 1 wherein the reference time and the initial frame are determined as an occurrence of a second type of transition effect selected from the library of transition effects in the memory of the marking circuit.

4. The method according to claim 1 wherein the information code is specific to an audio/video content sequence and sent to the receiver device by a managing center either via control messages or managing messages, or other configuration messages associated to the audio/video content sequence within the input digital data stream.

5. The method according to claim 1 wherein a series of secret symbols are mapped to all or part of the unique identifier stored in a configuration memory of the receiver device.

6. The method according to claim 1 wherein the secret symbol is either initially associated to each stored transition effect as a constant or said secret symbol is generated by combining a type reference of a transition effect with a location of the transition effect within the media content sequence.

7. A receiver device configured to mark a media content sequence in a digital data stream, the receiver device comprising:
- at least one processor;
- at least one memory;
- a descrambler;
- a decoder configured to:
  - produce a clear sequence of media content, said sequence comprising a succession of media frames;
  - select at least two decoded consecutive media frames from the clear media content sequence according to a predefined information code previously stored in a configuration setting memory of the receiver device, the information code comprising instructions and parameters indicating a type of transition effect, locations of the transition effects either in form of time stamps relative to a reference time or in form of a number of frames after an initial frame, and the at least two decoded consecutive media frames including a preceding media frame and at least one immediately following media frame; and
- a marking circuit configured to:
  - insert a first mark between the preceding media frame and the at least one immediately following media frame, the first mark comprising a transition effect being retrieved from a library of transition effects stored in a memory of the marking circuit;
  - insert a second mark between two consecutive media frames, the second mark preceding the at least two decoded media frames, the second mark comprising a secret information symbol indicating an absence or presence of the first mark between the at least two decoded consecutive media frames;
  - assign a secret symbol to the first mark, the secret symbol being formed by a bit string associated to all or part of a unique identifier specific to the receiver device; and
  - output a modified clear sequence of media content comprising the first mark between the at least two decoded consecutive media frames and the second mark.

8. The receiver device according to claim 7 wherein the clear sequence of media content comprises video frames or audio frames, said sequence being modified by inserting transition effects between the at least two consecutive video frames or audio frames.

9. The receiver device according to claim 7 wherein the reference time and the initial frame are determined as an occurrence of a second type of transition effect selected from the library of transition effects in the memory of the marking circuit.

10. The receiver device according to claim 7 wherein the information code is specific to an audio/video content sequence and received by the receiver device from a managing center either via control messages, or managing messages, or other configuration messages associated to the audio/video content sequence within the input digital data stream.

11. The receiver device according to claim 7 wherein a series of secret symbols are mapped to all or part of the unique identifier stored in a configuration memory of the receiver device.

12. The receiver device according to claim 7 wherein the secret symbol is either initially associated to each stored transition effect as a constant or said secret symbol results from a combination of a type reference of a transition effect with a location of the transition effect within the media content sequence.

13. The method according to claim 1 wherein the transition effect comprises a visual effect, an audio effect, or a combination thereof.

14. The receiver device according to claim 7 wherein the transition effect comprises a visual effect, an audio effect, or a combination thereof.

* * * * *